July 5, 1938.  C. F. JONES  2,122,689
APPARATUS FOR COPYING COLOR FILM
Filed March 9, 1936

INVENTOR.
Charles F. Jones.
BY
ATTORNEY.

Patented July 5, 1938

2,122,689

UNITED STATES PATENT OFFICE 2,122,689

APPARATUS FOR COPYING COLOR FILM

Charles F. Jones, Burlingame, Calif.

Application March 9, 1936, Serial No. 67,750

7 Claims. (Cl. 95—75)

My invention relates broadly to photographic printing apparatus and more particularly to improvements in cinematographic printers adapted for copying colored films.

As disclosed in my prior copending application Serial No. 25,714 filed June 10, 1935, I have found it highly desirable when copying films that have been colored, to use a printing light which is composed of a plurality of component beams of varying predetermined spectral ranges. These component beams may of course be produced and combined in a number of different ways and various systems of regulating them may be employed.

In my copending application Serial No. 47,092 filed October 28, 1935, I have disclosed and claimed an apparatus adapted to furnish a plurality of differently colored printing lights which includes means for varying the intensity of the printing lights at the printing aperture without variation in the intensity of the light source. In general this is accomplished by the use of appropriate filters of different densities and a highly efficient apparatus is therein disclosed for automatically varying the filters as needed.

As is well known in the art, the photographic response of a light sensitive emulsion when exposed to light is a function of the intensity of the exposure light and the duration or time of exposure, and whereas the apparatus of my application last mentioned was directed principally to varying the exposure by varying the intensity factor, it is the major object of this invention to provide apparatus for varying the amount of exposure by varying the time thereof.

The present invention contemplates the provision of a plurality of printing lights of different spectral range and means for varying the time that the film is exposed to each, without varying the speed of travel of the film being copied or the film receiving the copy. From the following description of my invention, it will become apparent that I have provided an apparatus that is simple in the extreme and at the same time is rapid and accurate, for once the required amount of exposure for a certain scene is determined, the same exposure time is assured for every copy made thereof.

The printing of motion picture film is either done intermittently by what are known as "step printers" or is accomplished continuously by printers which impart a continuous motion to the film strip. Although my invention is particularly adapted for use with continuous printers, it will be seen that it can be used in conjunction with both of said types of printer and therefore has a general utility in all color processes where copies of colored film are made.

In the accompanying drawing which illustrates a preferred embodiment of my invention:

Figure 1:
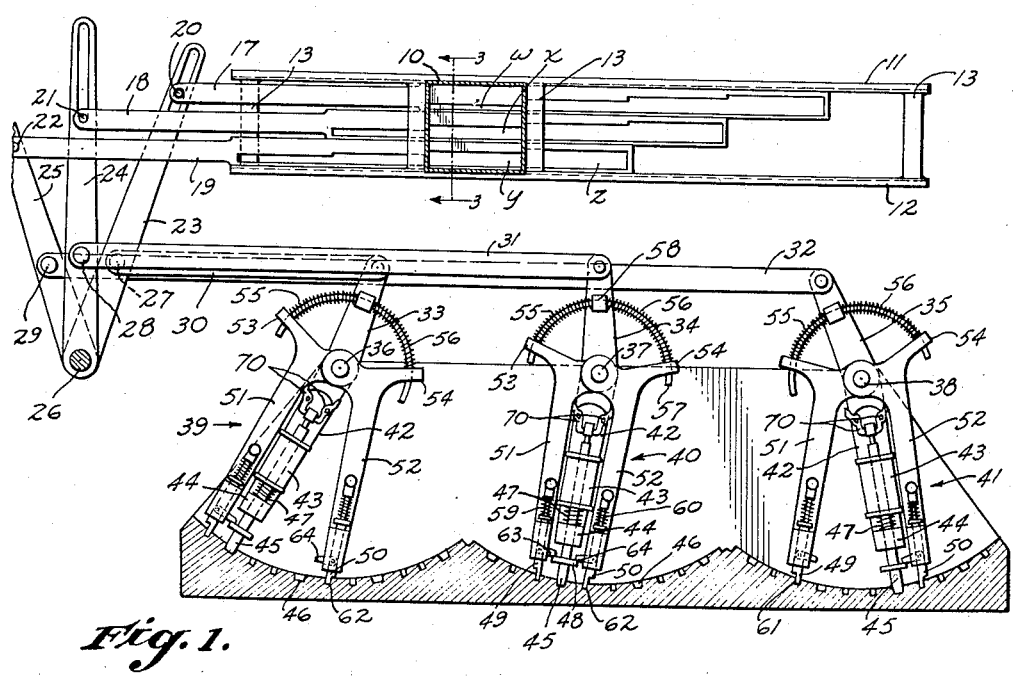
Fig. 1 is a partial front elevation showing a printer gate, the filter slides and the semi-automatic light change means.

Referring now to the drawing, the numeral 10 indicates the printing gate of a printer of any convenient type (not shown), the gate defining a printing aperture of the required width to accommodate a given size of motion picture film. The height of the aperture will usually be equal to one picture frame, but this is not essential. The film to be copied and the film to receive the copy are led past the aperture in known manner and thereby exposed to light passing through the aperture of gate 10 from a source not shown.

Figure 3:
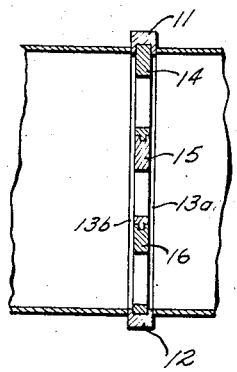
Fig. 3 is a vertical end view section taken at 3—3 in Fig. 1.

Disposed in front of the gate 10 is a substantially horizontal frame comprising upper and lower horizontal guide members 11 and 12 which are held together in spaced relationship by vertical cross members 13 which are themselves formed of parallel spaced ribs 13a and 13b as seen best in Fig. 3. The horizontal guide pieces 11 and 12 are provided with inwardly facing grooves which provide opposing horizontal guideways. A plurality of longitudinal slides 14, 15, and 16 provided with tongue and groove edges, as shown, are mounted in the frame and slide horizontally in the grooves of guide pieces 11 and 12. The slides being tongue and grooved are independently slidable with respect to each other, each constituting part of the guideway for its adjacent slide, all of them being supported against lateral bending by the vertical ribs 13a and 13b.

Figure 2:
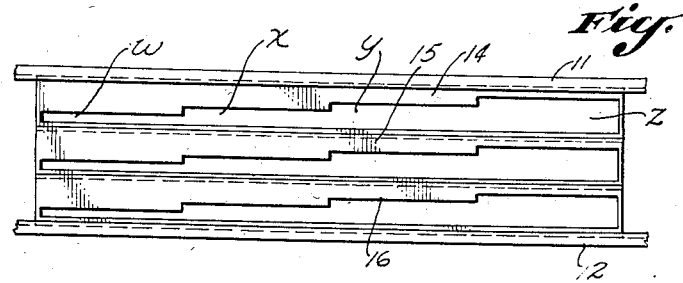
Fig. 2 is an enlarged vertical section of the slides.

As is shown most clearly in Fig. 2 each of the horizontal slides 14, 15, and 16 is provided with a plurality of elongated shoulder portions or steps which define apertures w, x, y, and z of different vertical dimensions. The slides are preferably made of metal or other relatively hard substance so that the shoulders can be carefully machined to very close dimensions to give extremely accurately sized apertures. Each slide may be provided with a filter of a different color the density and spectral range of which is determined by the type of film and process being used. In the form shown three slides are provided, each with a filter which in general passes one of the primary colors, although it will be understood of course that more or less filter slides may be used as desired.

The aperture slides may of course be adjusted manually to secure the proper part beam apertures, but I deem it highly desirable to effect the change mechanically and have therefore illustrated one satisfactory means for accomplishing the change semi-automatically. As seen best from Fig. 1, the slides 14, 15, and 16 are provided with extensions 17, 18, and 19 respectively which are provided with bifurcated ends and pins 20, 21, and 22 adapted to slide in the slots of rockers 23, 24, and 25. All of the rockers may be pivoted about a pin 26, although they may have separate pivotal points if desired. The rockers 23, 24, and 25 are provided with pins 27, 28, and 29 respectively to which one end of horizontal rods 30, 31, and 32 are pivotally fastened. The other ends of the rods 30, 31, and 32 are pivotally connected to operating arms 33, 34, and 35 which are rotatable on pins 36, 37, and 38. The rods 30, 31, and 32 are preferably made of different lengths so that the three setting mechanisms 39, 40, and 41 of which arms 33, 34, and 35 are a part may be disposed side by side all facing the same way, to facilitate operation.

In that the three setting mechanisms 39, 40, and 41 may be made alike and are so illustrated in Fig. 1, I will only describe one of them in detail, to-wit: the center one indicated by the numeral 40. In this setting mechanism the operating arm 34 which is pivotally mounted on pin 37 has an extended portion 42 substantially rectilinear with the arm 34, which extended portion I will term the holding arm. This holding arm 42 is preferably cored at its outer or lower end to accommodate a solenoid 43 whose armature 44 has the diameter of its lower end reduced to form a pin 45 adapted to seat in notches 46 of a curved plate formed as the arc of a circle described about 37 as a center. The armature 45 is forced away from the solenoid 43 by a spring 47 bearing against a shoulder thereof with the result that pin 45 is normally held in one of the notches 46 to prevent rotational movement of holding arm 42. The pin 45 carries an annular flange 48 fast thereto and adjacent its lower end.

A pair of setting arms 51 and 52 are pivotally mounted on pin 37 and normally are substantially parallel to holding arm 42 and on either side thereof. The setting arms are formed with outwardly extending portions 53 and 54 at their upper ends respectively, each of which is laterally cored to accommodate and slide over a circular rod 57 carried by operating arm 34. Helical springs 55 and 56 surround the circular rod 57, one end of each abutting against a shoulder 58 and the other end against the arms 53 and 54 respectively. The lower ends of setting arms 51 and 52 are provided with slidable dogs 49 and 50 adapted to be forced outwardly by springs 59 and 60 to normally seat in notches 61 and 62 on either side of notches 46. The pins 49 and 50 have spring hinged lugs 63 and 64 respectively, adapted to be engaged by the annular flange 48 when the armature 44 is raised.

Figure 4:
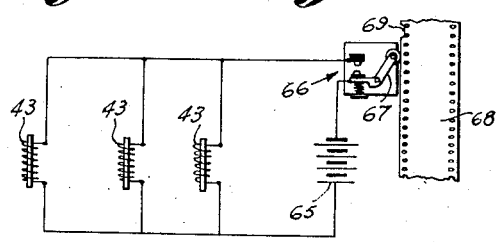
Fig. 4 is a wiring diagram.

As mentioned, all three of the setting mechanisms may be identical and constructed as just described for mechanism 40 and by reference to Fig. 4 it will be seen that the solenoids 43 of the three mechanisms are connected in parallel to a source of electrical energy 65 through a switch 66. The switch is normally kept open by reason of an arm and roller 67 which rides on the edge of the film 68 being copied. However, when the roller 67 drops into notches 69 provided along the film edge, the switch is closed and all of the solenoids are energized.

In copying a colored film by the use of different colored printing lights, it is of course necessary to first determine the spectral range of the individual lights to be used, due regard being had for the type of film available, the number and range of the colors to be copied and the type of process employed to secure the ultimate colors. When the desired wave lengths of the various component beams have been chosen appropriate filters adapted to pass these wave lengths are inserted in the three slides 14, 15, and 16 respectively, so that each of the apertures $w$, $x$, $y$, and $z$ in each slide will then pass light of the required color. Once these filters have been chosen, it will seldom be necessary to change them unless some of the basic factors just mentioned are varied.

As previously mentioned, I have found that in copying colored film improved results are obtained by using different colored printing lights to copy the different colored parts of the images and by controlling the individual exposures, it is possible to compensate for errors in the color sensitivity of the film and its photographing and processing. In that the color balance depends largely on the density of the various part images making up the composite colored print, the control of color resolves itself principally into a matter of controlling the exposure of the various colors to their corresponding printing lights.

In printing according to the present invention the sensitive film is tested to determine the color response of the various emulsion strata and the color characteristics of the film to be copied are noted. From these results the time of exposure to each of the various colored printing lights is determined, the exact method of such determination forming no part of the present invention. As is well known in the art, the time of exposure for any given portion of a film passing down across the printing gate 10 at a given speed depends directly on the size of the aperture, and according to my invention the size of the exposure aperture for each of the component beams depends upon the position of the particular slide at the gate 10, for by moving the slide laterally of the gate 10, any one of the various apertures $w$, $x$, $y$, and $z$ may be registered therewith.

It will be noted that each of the setting mechanisms have four positions corresponding to the four aperture spaces $w$, $x$, $y$, and $z$ of their corresponding slides. For purposes of illustration I have shown in Fig. 1 the mechanism 39 which controls slide 14 as set at its extreme left hand position so that aperture $w$ of slide 14 is abreast of the gate 10. The center mechanism 40 is shown as set to place aperture $x$ of slide 15 at the gate 10, and mechanism 41 is in a position to cause aperture $y$ of slide 16 to register with the gate 10. If, for example, the slides 14, 15, and 16 have red, green and blue filters respectively, the above settings mean that each portion of the film as it passes the gate 10 at a constant speed will be exposed successively to red light for a short time, green light for a little longer time and blue light for a still longer time.

Before the printing operation is started the film has been notched in known manner at points along its length where it is desired to change the density of a particular color or colors in the scene to be printed. The slides having been set to give the required exposure times for the first scene to be printed, for example with the apertures w, x, and y abreast of the gate 10 as illustrated, the printer is started and the films pass down across the gate 10 in known manner. The operator then looks at his card of printing lights to see if the next scene calls for a change in exposure time for any color. The next scene may for example call for a larger aperture on the red and a smaller one on the blue, and in this case the setting arm 52 of mechanism 39 and the setting arm 51 of mechanism 41 are moved over to the positions shown in Fig. 1. This is accomplished by pulling up on the dogs 50 and 49 of mechanisms 39 and 41 respectively and rotating the setting arms about their pins 36 and 38 respectively until they are opposite the required notches 62 and 61 respectively, where the pins 50 and 49 are released and allowed to engage their respective notches in the positions illustrated. The rotation of the setting arms builds up compression in the springs 56 and 55 of the mechanisms 39 and 41, but no movement of the holding arms takes place until the next notch of the film reaches the roller 67.

When the switch 66 is closed by the reason of the roller 67 dropping into the next notch 69, all three of the solenoids 43 are energized and pull their respective armatures 44 upwardly against the springs 47. In the case of setting mechanism 40 the movement of the armature 44 withdraws the pin 45 from its notch 46 and in so doing the flange 48 pulls the dogs 49 and 50 up out of their respective notches 61 and 62 by reason of the engagement between the flange 48 and the lugs 63 and 64 of the pins 49 and 50. However, no rotation of the setting mechanism is effected as no compression has been built up in either of the springs 55 or 56 and the slide 15 is consequently not moved from its position.

However, in the case of mechanism 39 where compression has been built up in its spring 56, the movement of the armature and consequent withdrawal of pin 45 and dog 49 from their respective notches, allows the holding arm 42 and setting arm 51 to rotate about pin 36 until they strike setting arm 52 previously moved to the position shown in Fig. 1 and held in position by the dog 50 being seated in notch 62. When the armature 44 is pulled up by the action of the solenoid, its upper end engages a latch 70 carried by holding arm 42 and is held thereby until the arm 42 strikes the setting arm 52, at which time the latch is released, and as the solenoid has been previously deenergized by the roller 67 rising out of the notch 69, the spring 47 causes the pin 45 and dog 49 to engage their respective notches 46 and 61 of their new position. This rotation of the holding arm 42 of course rotates its operating arm 33 which pushes rod 30 to the left to rotate rocker 23 about pin 26. The rotation of the rocker 23 in a counterclockwise direction pulls the extension 17 and slide 14 to the left one position to place aperture x of slide 14 before the gate 10 where it remains until again changed due to a resetting and tripping of mechanism 39.

The response of setting mechanism 41 to the action of its solenoid 43 is similar to that just explained for mechanism 39 except that the movement is in the other direction. Here the movement of the armature 44 also withdraws holding arm pin 45, but the flange 48 in this case releases dog 50 allowing the compression in spring 55 to rotate the arms to their new position. Rotation of holding arm 42 causes operating arm 35 to rotate clockwise to pull rod 32 to the right to rotate rocker 25 clockwise to push extension 19 and slide 16 to the right one position which places aperture x of slide 16 before the gate 10.

It will be apparent that the same cycle of operations is repeated every time a notch passes the roller 67 and only the setting mechanisms which have been reset will be affected.

In copying an entire reel of motion picture film, it will often be found that the color balance from scene to scene need not be changed, but that the overall density of the various scenes must be evened up due to the scenes having been photographed under different conditions. This regulation of overall density without changing the ratio of the component beam exposures may of course be accomplished by varying the size of each of the component beam apertures proportionately. However, this regulation can also be effected by providing separate means, usually between the light source and the gate 10, for varying the intensity of the light reaching the gate 10. There are numerous well known means for accomplishing this overall density control, none of which form any part of this invention. It should be noted, however, that most light change devices are responsive to a roller riding the film edge and by employing the mechanism of my invention, it is possible to use the same notches for both the overall density change and the component beam density changes.

It is to be understood that while I have shown one preferred form of apparatus embodying my invention, that numerous modifications thereof may be made without departing from the spirit of the invention. For instance, if more or less colored beams are desired, the number of slides can of course be increased or decreased, and likewise the difference between the sizes of the apertures may be increased or decreased to vary the exposure times. While I have shown a semi-automatic means for changing the slide position, they could of course be moved by hand whenever a change was desired, or if the apertures are to be changed but seldom, individual slides of different aperture sizes could be provided and inserted or removed by hand to vary the time of exposure to the component beams. Likewise, equivalent types of setting and tripping mechanisms may be substituted to change the position of the slides in response to film notches or other actuating means. These and other modifications will occur to those skilled in the art, and it is the intention herein not to limit the scope of this invention to the precise form shown, but rather to give it the full scope of the appended claims.

I claim as my invention:—

1. An apparatus for copying a series of colored photographic images carried on a film strip which includes: a light source; means for defining the path of light from said source; a frame extending across said light path; a plurality of strips slidable in said frame, each of said strips being provided with a series of apertures of different sizes and with a filter across said apertures, the filters on said strips being of different colors respectively; and means for leading said film strip and a light sensitive film across said plurality of component light paths thus formed.

2. An apparatus for copying a series of colored photographic images carried on a film strip which includes: a light source; means for defining the path of light from said source; a frame extending across said light path; a plurality of strips slidable in said frame, each of said strips being provided with a series of apertures of different sizes and with a filter across said apertures, the filters on said strips being of different colors respectively; means for independently sliding said strips in said frame to register different apertures in said light path; and means for leading said film strip and a light sensitive film across said plurality of component light paths thus formed.

3. An apparatus for copying a series of colored photographic images carried on a film strip which includes: a light source; means for defining the path of light from said source; a frame extending across said light path; a plurality of strips slidable in said frame, each of said strips being provided with a series of apertures of different sizes and with a filter across said apertures, the filters on said strips being of different colors respectively; means responsive to notches along the edge of said film strip for independently sliding said strips in said frame to register different apertures in said light path; and means for leading said film strip and a light sensitive film across said plurality of component light paths thus formed.

4. An apparatus for copying a series of colored photographic images carried on a film strip which includes: a light source; a plurality of aperture plates disposed in the path of light from said source; means for leading said film strip and a light sensitive film across said light path and in front of said aperture plates; a series of operating arms operatively connected to said aperture plates; and means for causing said arms to move said plates a predetermined distance at a predetermined time.

5. An apparatus for copying a series of colored photographic images carried on a film strip which includes: a light source; a plurality of aperture plates disposed in the path of light from said source; means for leading said film strip and a light sensitive film across said light path and in front of said aperture plates; a series of operating arms operatively connected to said aperture plates; a pair of setting arms spring connected to said operating arms whose position can be varied independently of said operating arms; and means for tripping said operating arms to cause them to follow said setting arms and move said plates a predetermined distance.

6. An apparatus for copying a series of colored photographic images carried on a film strip which includes: a light source; a plurality of aperture plates disposed in the path of light from said source, each of said plates being provided with a series of laterally positioned apertures of different vertical dimensions; means for leading said film strip and a light sensitive film across said light path and in front of said aperture plates; a series of operating arms operatively connected to said aperture plates; and means for causing said arms to move said plates a predetermined distance at a predetermined time.

7. An apparatus for copying a series of colored photographic images carried on a film strip which includes: a light source; a plurality of aperture plates disposed in the path of light from said source, each of said plates being provided with a series of laterally positioned apertures of different vertical dimensions; means for leading said film strip and a light sensitive film across said light path and in front of said aperture plates; a series of operating arms operatively connected to said aperture plates; a pair of setting arms spring connected to said operating arms whose position can be varied independently of said operating arms; and means for tripping said operating arms to cause them to follow said setting arms and move said plates a predetermined distance.

CHARLES F. JONES.